US012565126B2

(12) United States Patent
Hunt et al.

(10) Patent No.: US 12,565,126 B2
(45) Date of Patent: Mar. 3, 2026

(54) VEHICLE TETHER STRUCTURE

(71) Applicant: NISSAN NORTH AMERICA, INC., Franklin, TN (US)

(72) Inventors: James Hunt, Fenton, MI (US); Antonio Manzari, Carlsbad, CA (US); Laurie Tait, San Diego, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 193 days.

(21) Appl. No.: 18/487,562

(22) Filed: Oct. 16, 2023

(65) Prior Publication Data

US 2025/0121746 A1     Apr. 17, 2025

(51) Int. Cl.
| | |
|---|---|
| B60N 2/28 | (2006.01) |
| B60N 2/68 | (2006.01) |
| B60R 22/26 | (2006.01) |

(52) U.S. Cl.
CPC ............ B60N 2/2809 (2013.01); B60N 2/688 (2013.01); B60R 22/26 (2013.01); B60R 2022/266 (2013.01)

(58) Field of Classification Search
CPC ...... B60N 2/2809; B60N 2/688; B60R 22/26; B60R 22/14; B60R 2022/266
See application file for complete search history.

(56) References Cited

U.S. PATENT DOCUMENTS

| | | | | |
|---|---|---|---|---|
| 4,813,722 | A | * | 3/1989 | Viscome ................. E05B 83/16 |
| | | | | 292/216 |
| 9,713,971 | B1 | | 7/2017 | Simonin et al. |
| 10,377,271 | B2 | * | 8/2019 | Bruck ................ B60N 2/01583 |
| 10,752,134 | B2 | | 8/2020 | Hoover |
| 2005/0161969 | A1 | | 7/2005 | Cuerrier et al. |
| 2007/0182195 | A1 | | 8/2007 | Chalhoub |
| 2019/0084448 | A1 | | 3/2019 | Hoover |

OTHER PUBLICATIONS

J Geiger, How Do Car Seats Fit in a 2022 GMC Sierra?, Cars.com, Oct. 19, 2022.

* cited by examiner

*Primary Examiner* — Syed A Islam
(74) *Attorney, Agent, or Firm* — Spencer Fane, LLP

(57) ABSTRACT

A vehicle tether structure includes a vehicle body structure, a seat and a tether bracket. The vehicle body structure includes an upright wall that at least partially defines a passenger compartment. The seat is installed to the passenger compartment adjacent to the upright wall. The tether bracket has an upright portion that is removably attached to the upright wall proximate an upper end of the seat. The tether bracket also has a horizontal portion that includes tether receiving openings for attachment thereto by a child seat.

19 Claims, 11 Drawing Sheets

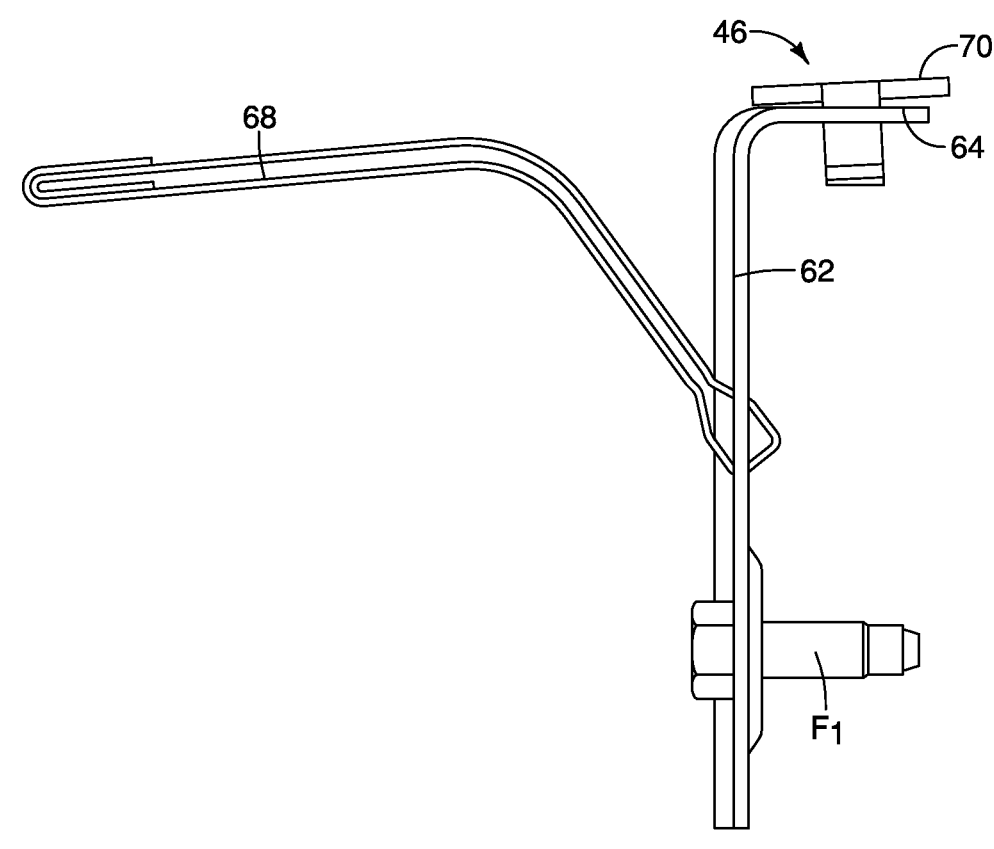
FIG. 11
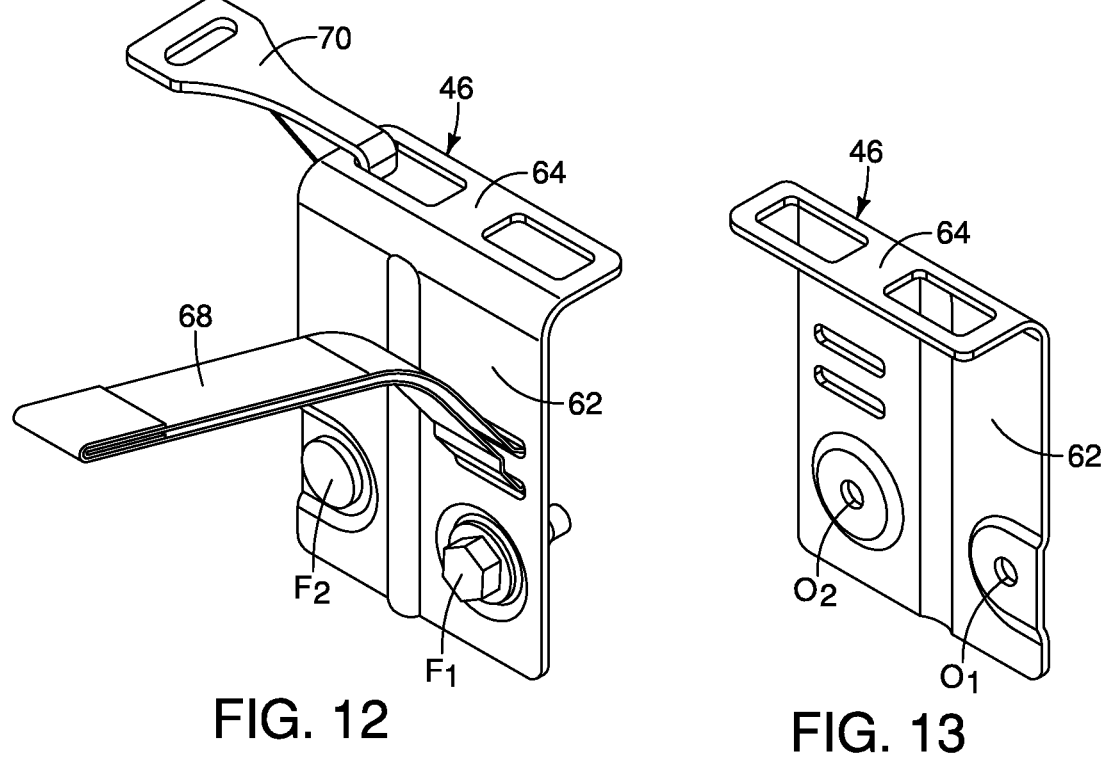
FIG. 12      FIG. 13

VEHICLE TETHER STRUCTURE

BACKGROUND

Technical Field

The present disclosure generally relates to a vehicle tether structure. More specifically, the present disclosure relates to a tether structure where a tether bracket is located proximate the upper end of a rear seat of the vehicle.

Background Information

Tether structures are standard features in many vehicles. The tether is typically located at the juncture of a lower seat portion and an upright seat portion of a rear seat.

SUMMARY

One object of the present disclosure is to provide a tether structure in a vehicle where the tether structure is located at or proximate the upper end of an upright seat portion of a rear seat.

In view of the state of the known technology, one aspect of the present disclosure is to provide a vehicle tether structure with a vehicle body structure, a seat and a tether bracket. The vehicle body structure includes an upright wall that at least partially defines a passenger compartment. The seat is installed to the passenger compartment adjacent to the upright wall. The tether bracket has an upright portion that is removably attached to the upright wall proximate an upper end of the seat. The tether bracket also has a horizontal portion that includes tether receiving openings for attachment thereto by a child seat.

BRIEF DESCRIPTION OF THE DRAWINGS

Referring now to the attached drawings which form a part of this original disclosure:

FIG. 11 is a side view of one of the tether bracket depicted in FIG. 10 showing the upright portion and the horizontal portion with the first strap attached to the upright portion of the tether bracket and the second strap attached to the horizontal portion in accordance with the first embodiment;

FIG. 12 is a perspective view of the tether bracket depicted in FIG. 10 in accordance with the first embodiment;

FIG. 13 is a perspective view of the tether bracket depicted in FIG. 9 with the first and second straps removed in accordance with the first embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
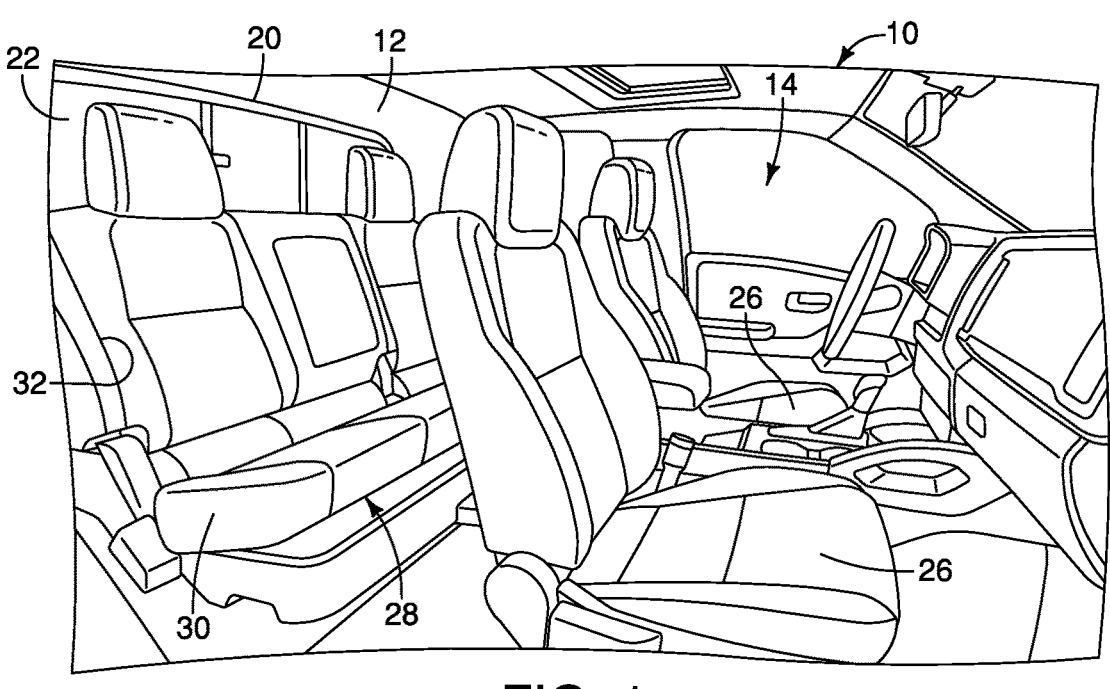
FIG. 1 is a side perspective view of a passenger compartment of a vehicle showing front seats, rear seats and a rear window of a rear upright wall in accordance with a first embodiment.

Referring initially to FIG. 1, a vehicle 10 having a vehicle body structure 12 that defines a passenger compartment 14 and includes a vehicle tether structure 16 is illustrated in accordance with a first embodiment. The vehicle tether structure 16 is described below after a brief description of the vehicle body structure 12 and features within the passenger compartment 14.

The vehicle body structure 12 includes structures that define the passenger compartment 14, including an upright wall 20 that defines a rear window opening 22. The upright wall 20 is the rear wall of the passenger compartment 14, that also includes side walls (with doors). In other words, the upright wall 20 at least partially defines the passenger compartment 14. A lower portion 24 of the upright wall 20 extends downward from the rear window opening 22.

Figure 2:
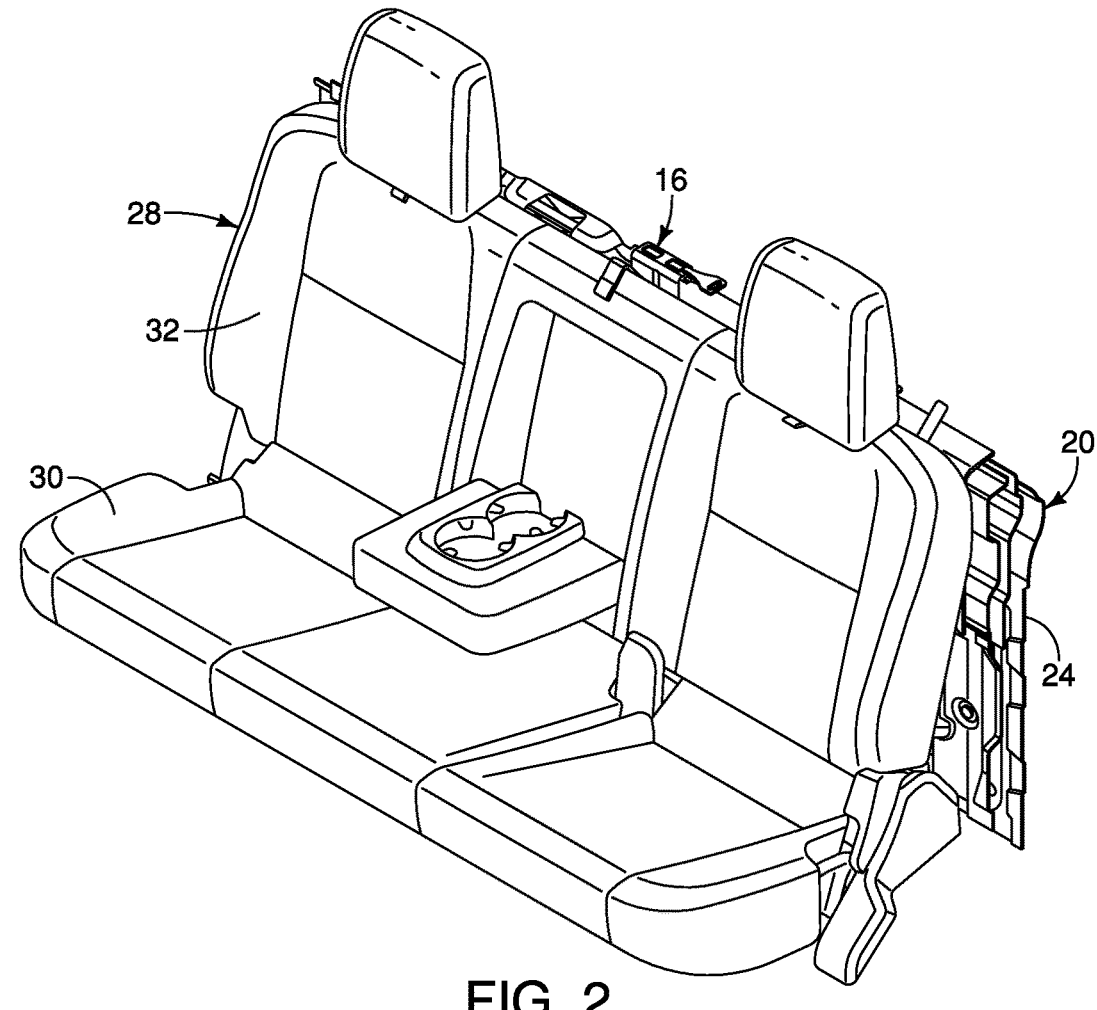
FIG. 2 is a perspective view of a portion of the rear upright wall with portions of the vehicle and portions of the passenger compartment removed showing a rear panel and a forward panel attached to the rear upright wall, a trim panel, a tether bracket and the rear seats with an upright seat portion of the rear seats in an upright orientation with a tether bracket extending above a central portion of the trim panel in accordance with the first embodiment.

The passenger compartment 14 includes front seats 26 and a rear seat 28 (herein after referred to as the seat 28). As shown in FIG. 2, the seat 20 includes a lower seat portion 30 and an upright seat portion 32. The upright seat portion 32 (also referred to as the seatback portion 32) is moveable between an upright orientation shown in FIG. 2 and a lowered orientation shown in FIG. 3. More specifically, the upright seat portion 32 pivots between the upright orientation and the lowered orientation relative to the lower seat portion 30. The rear seat 28 is installed to the floor (not shown) of the passenger compartment 14 such that with the seatback portion 32 in the upright orientation, the seatback portion 32 is adjacent to and covers a majority, if not all, of the lower portion 24 of the upright wall 20.

As is shown in FIGS. 2-7, the lower portion 24 of the upright wall 20 (beneath the rear window opening 22) is configured to support the tether structure 16. The tether structure 16 includes a rear panel 40, a forward panel 42, a trim panel 44, a tether bracket 46 and a cover 48.

The rear panel 40 and the forward panel 42 are preferably made of a metal material, such as sheet metal, deformed to define the various shapes depicted in the drawings. The rear panel 40 and the forward panel 42 can be welded to one another or can be attached to one another via mechanical fasteners to define a hollow horizontal beam, beams and/or other structural features. The rear panel 40 is fixed to the lower portion 24 (also made of metal) via mechanical fasteners or welding techniques.

The trim panel 44 can be made of any of a variety of materials such as sheet metal, plastic or a composite material. In the depicted embodiment, the trim panel 44 is preferably made of a plastic or resin material. The trim panel 44 includes a plurality of openings 50 along an upper perimeter thereof. The trim panel 44 includes an upper horizontally oriented upper edge 52 or ledge 52 that extends horizontally approximately the width of the passenger compartment 14 from side wall to side wall of the passenger compartment 14. The end portions of the trim panel 44 have been cutaway (cross-sections) in order to reveal details of the rear panel 40 and the forward panel 42. The upper edge 52 (or ledge 52) abuts the upright wall 20 proximate and below a lower end of the rear window opening 22. The forward panel 42 is also referred to herein below as the upright panel 42.

Figures 5, 6:
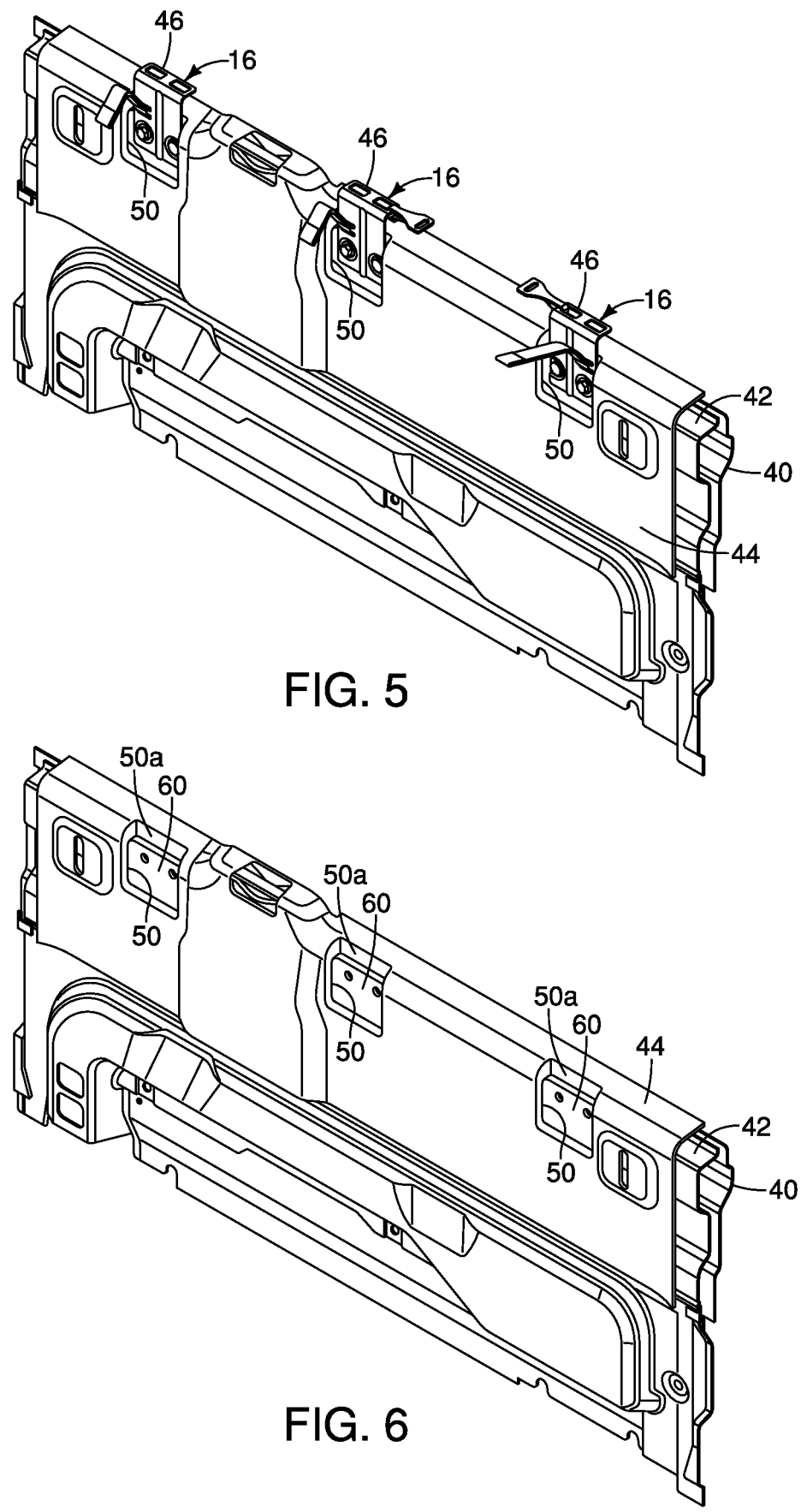
FIG. 5 is another perspective view similar to FIGS. 2-4 showing the trim panel and the three openings with the three covers removed showing the three openings and upright portions (lower portions) of three tether brackets in accordance with the first embodiment.
FIG. 6 is another perspective view similar to FIGS. 2-5 showing the trim panel and the three openings with the three covers and three tether brackets removed showing three tether attachment surfaces of the forward panel in accordance with the first embodiment.
Figure 7:
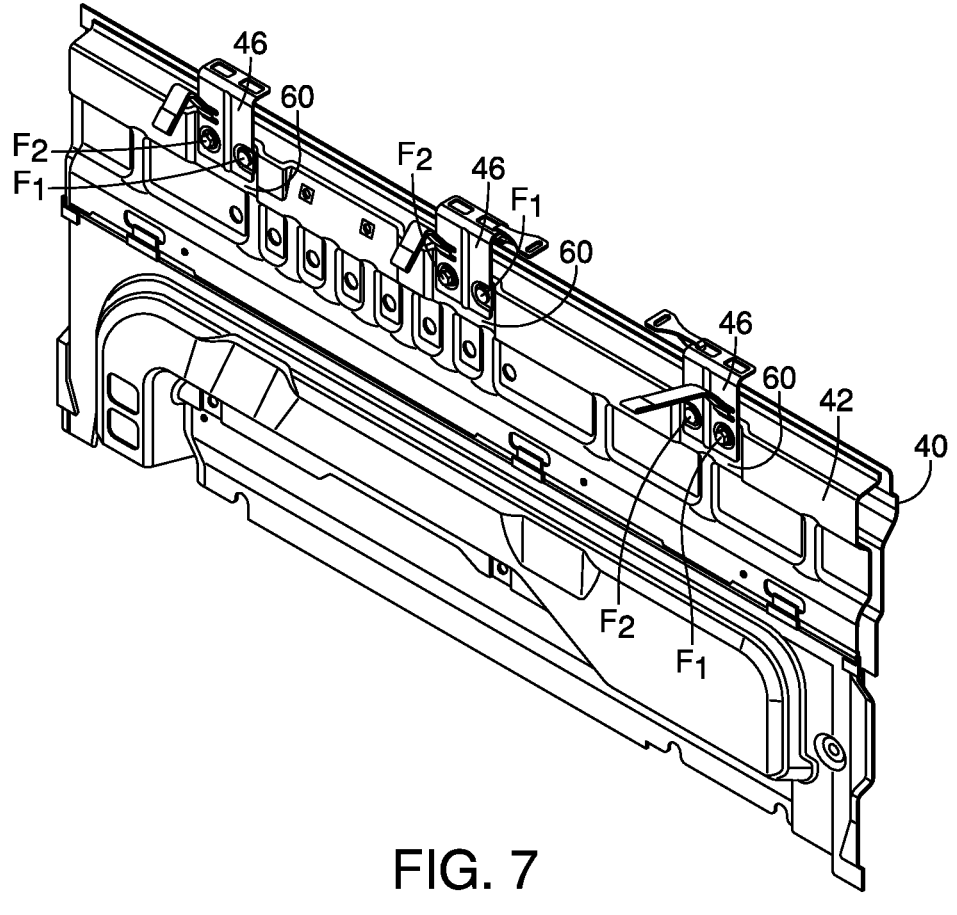
FIG. 7 is another perspective view similar to FIGS. 2-6 showing the forward panel with the trim panel removed showing the three tether brackets fixed to the three tether attachment surfaces of the forward panel in accordance with the first embodiment.
Figure 8:
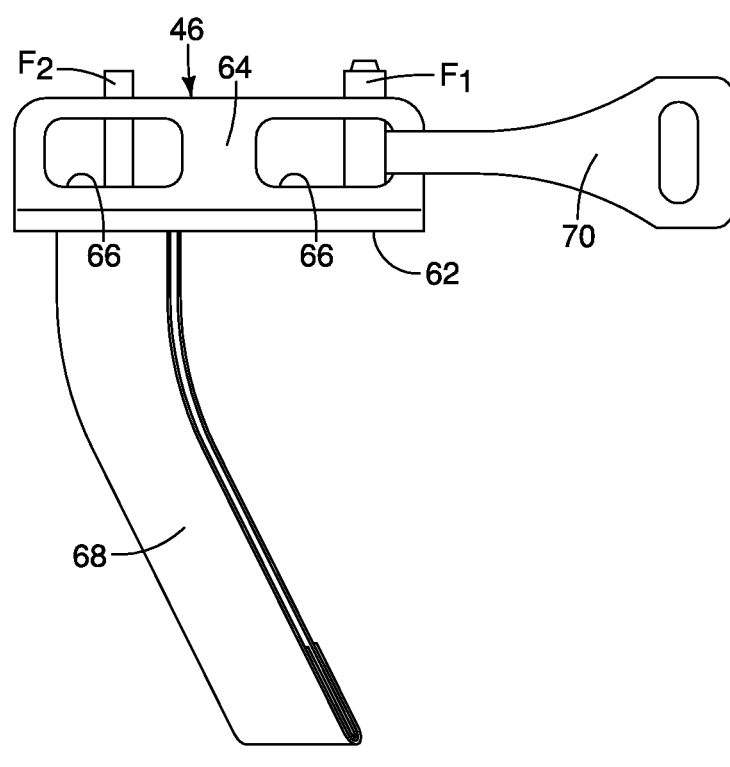
FIG. 8 is a top view of one of the tether brackets removed from the forward panel showing the horizontal portion and the openings in the horizontal portion with a first strap attached to the upright portion of the tether bracket and extending in a forward direction and a second strap extending through one of the openings in the horizontal portion in accordance with the first embodiment.
Figure 9:
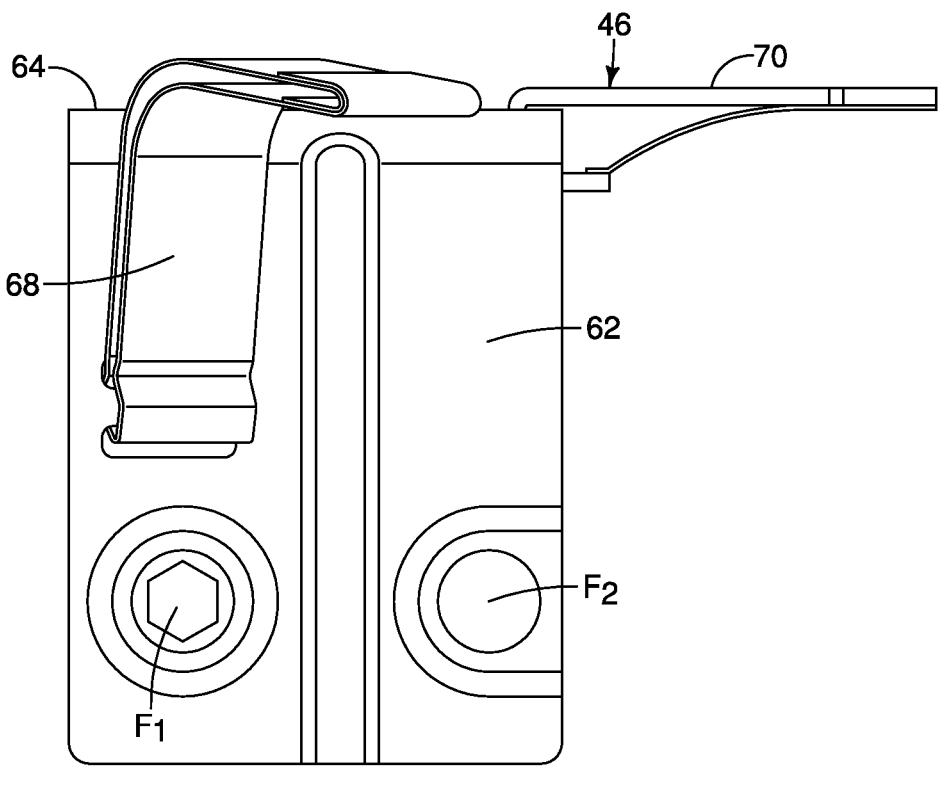
FIG. 9 is a front view of the tether bracket depicted in FIG. 8 removed from the forward panel showing the upright portion and the horizontal portion with the first strap looped through and attached to a pair of slots in the upright portion of the tether bracket and the second strap extending through the opening in the horizontal portion in accordance with the first embodiment.
Figure 10:
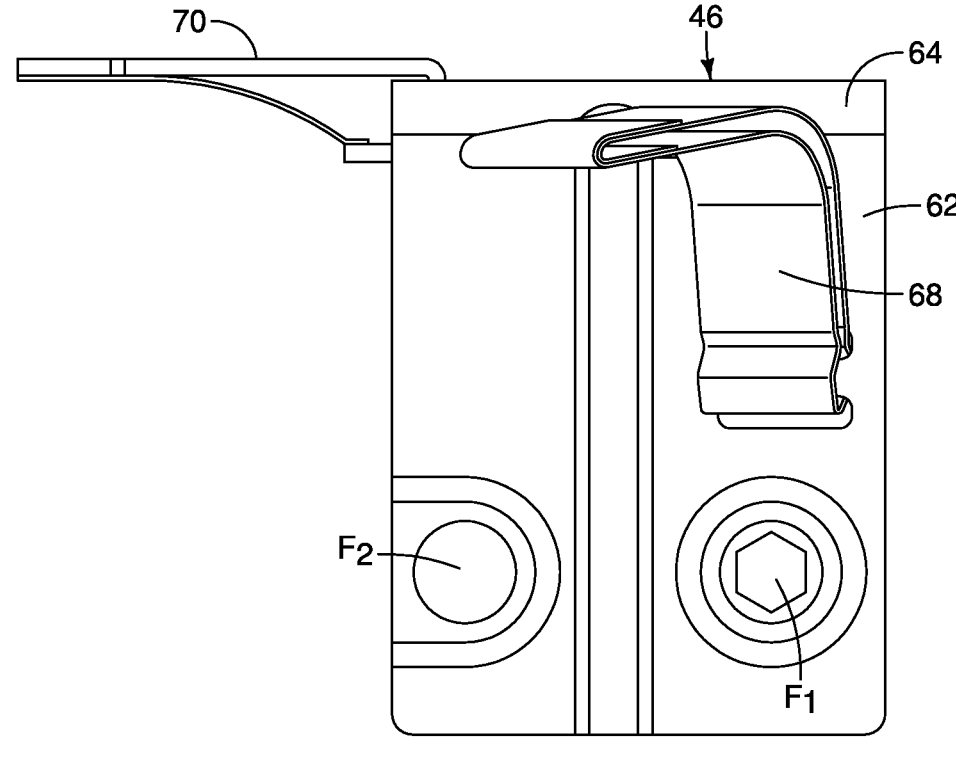
FIG. 10 is a front view of another one of the tether brackets removed from the forward panel showing the upright portion and the horizontal portion with the first strap looped through and attached to the pair of slots in the upright portion of the tether bracket and the second strap extending through the opening in the horizontal portion in accordance with the first embodiment.
Figure 14:
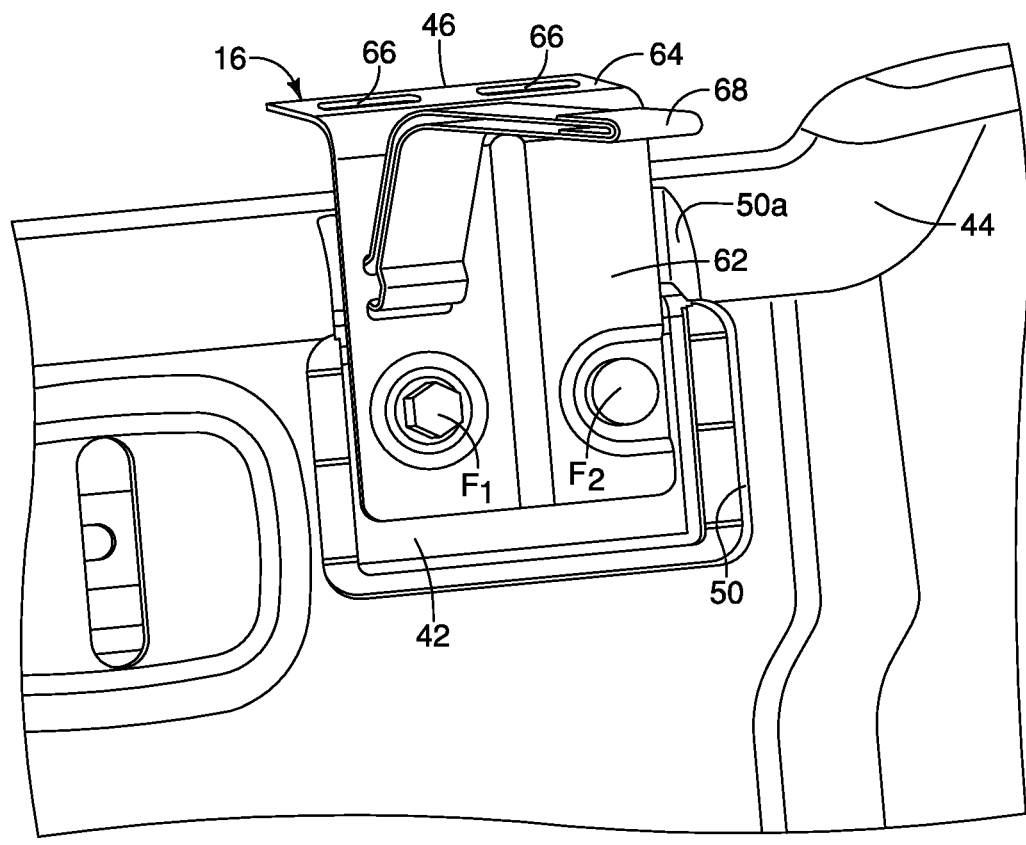
FIG. 14 is a perspective view of the tether bracket depicted in FIGS. 9 and 13 with the first and second straps attached thereto and with the tether bracket attached to the corresponding tether attachment surface of the forward panel and further with the trim panel attached to the forward panel and the upper portion of the tether bracket extending through a corresponding one of the openings in the trim panel with the cover removed in accordance with the first embodiment.
Figure 15:
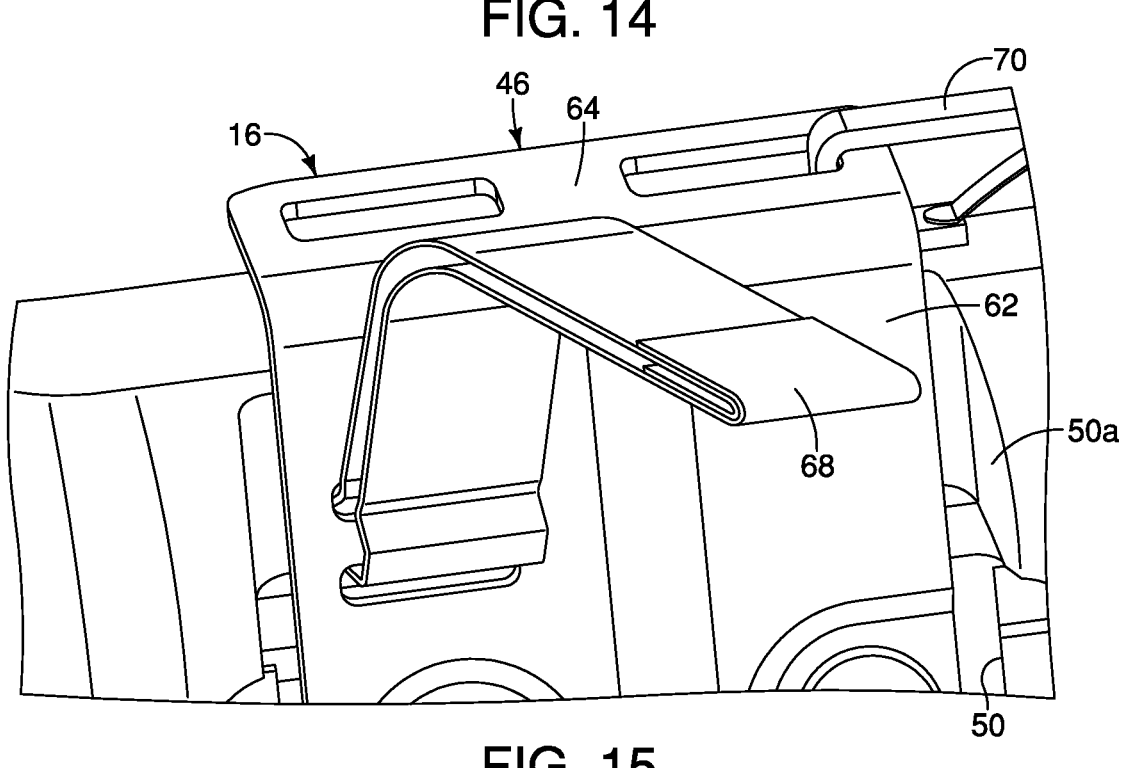
FIG. 15 is another perspective view of the tether bracket depicted in FIGS. 9 and 13-14 with the tether bracket attached to the corresponding tether attachment surface of the forward panel and with the trim panel attached to the forward panel such that the upper portion of the tether bracket extends through a corresponding one of the openings in the trim panel with the cover removed in accordance with the first embodiment.
Figure 17:
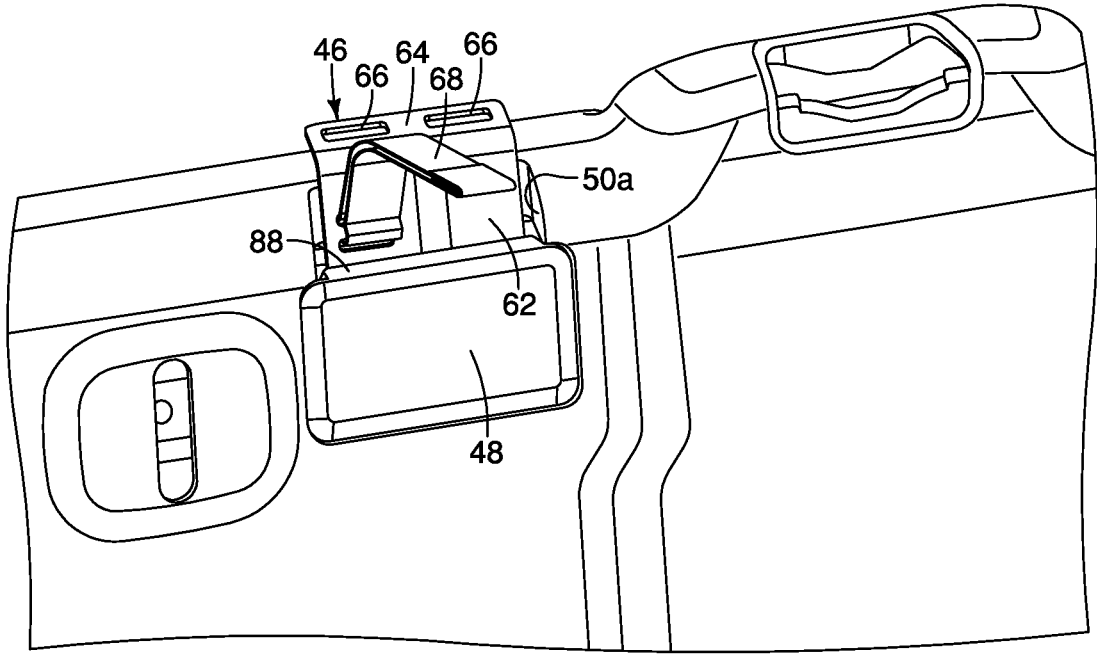
FIG. 17 is another perspective view of the trim panel, the tether brackets and the covers showing further detail of the cover in accordance with the first embodiment.
Figure 18:
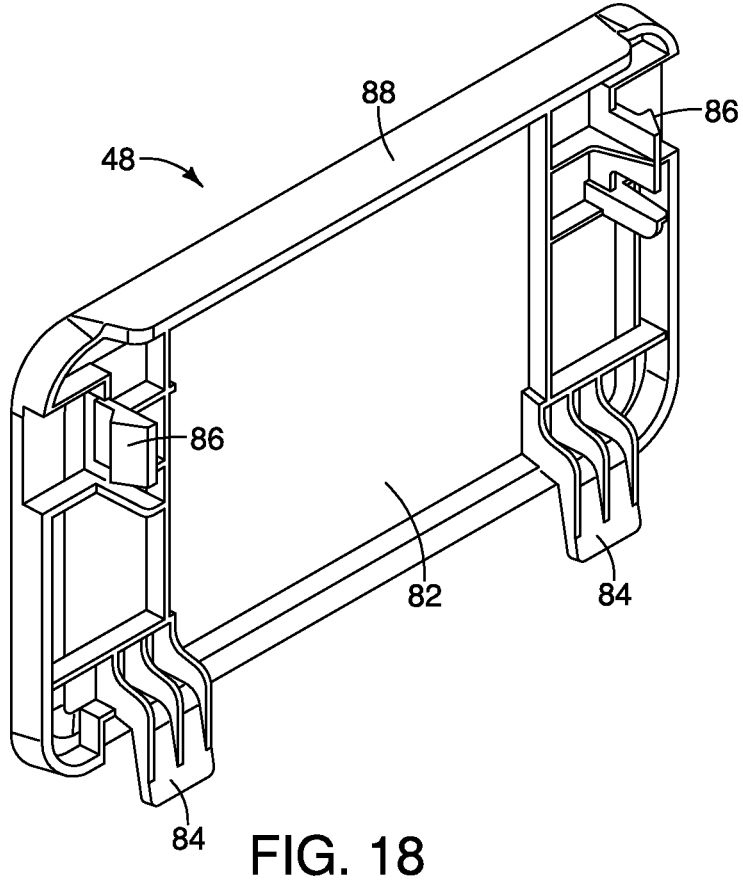
FIG. 18 is a perspective view of the rear surface of one of the covers shown removed from the trim panel in accordance with the first embodiment.
Figure 19:
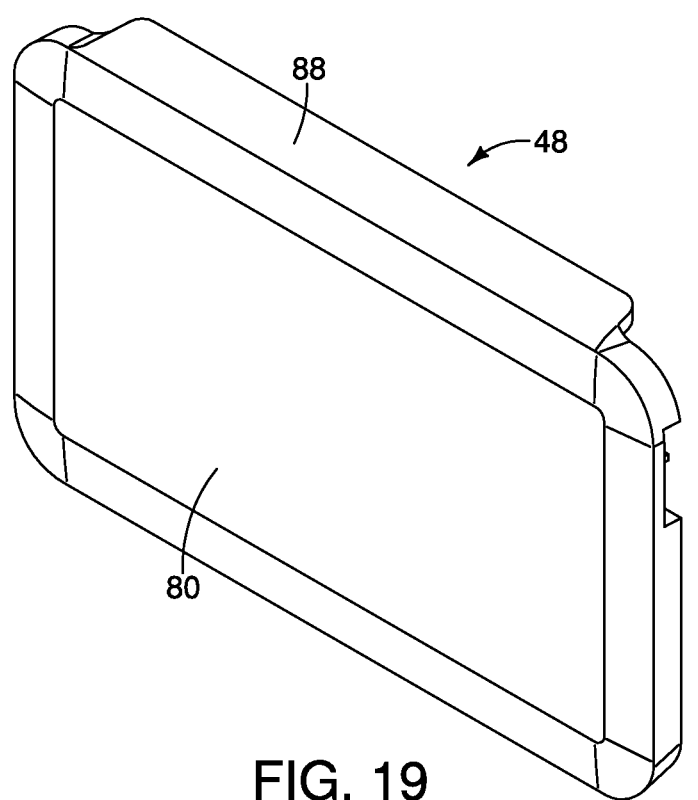
FIG. 19 is a perspective view of the front surface of the cover depicted in FIG. 18 shown removed from the trim panel in accordance with the first embodiment.
Figure 20:
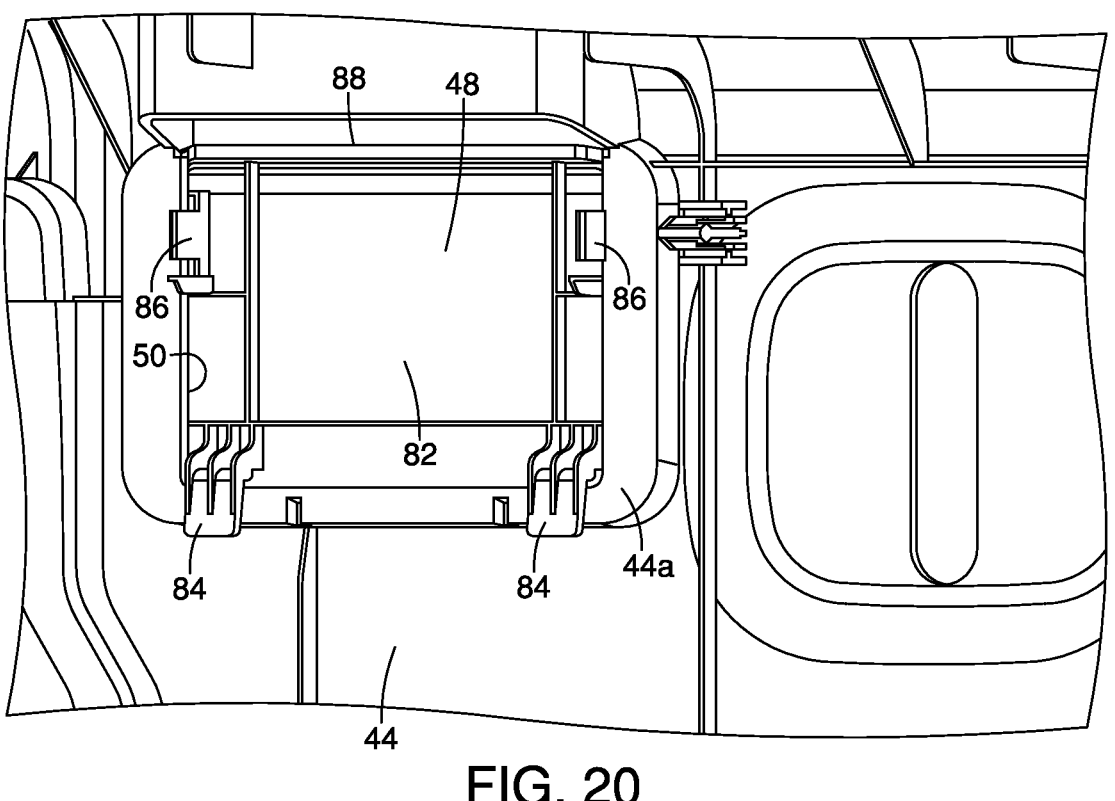
FIG. 20 is a rear perspective view of the trim panel with the cover installed to a corresponding one of the openings showing lower hooks trapping a portion of the trim panel thereby retaining a lower end of the cover to the trim panel and with upper hooks snap-fitted to corresponding side of the trim panel that define the opening in accordance with the first embodiment.
Figure 21:
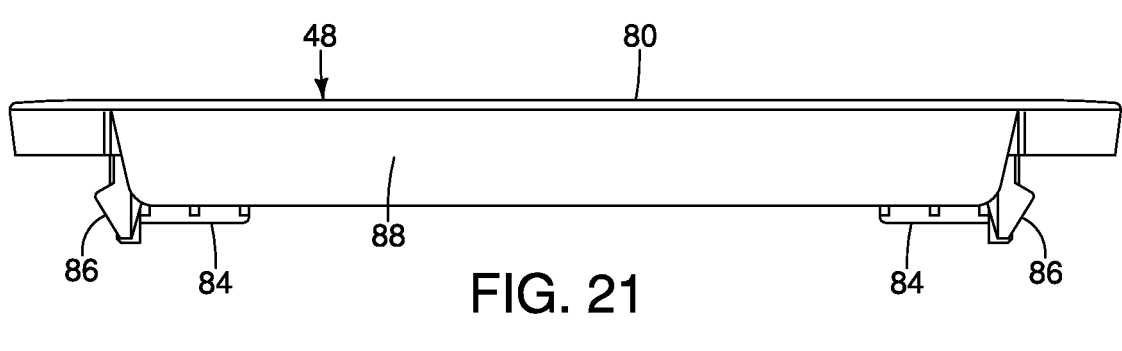
FIG. 21 is a top view of the cover removed from the trim panel in accordance with the first embodiment.
Figure 22:
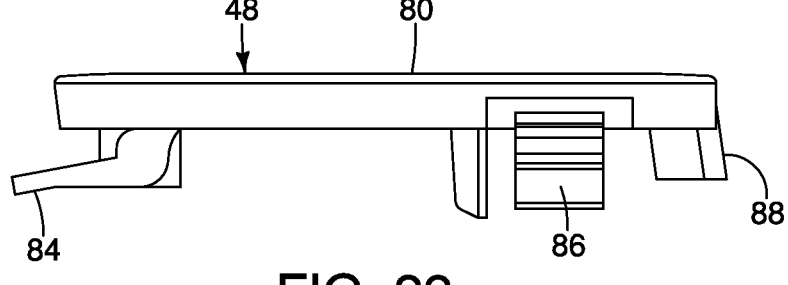
FIG. 22 is a side view of the cover removed from the trim panel in accordance with the first embodiment.

In the depicted embodiments there are three openings 50, as shown in FIGS. 3-6. Upper ends of each of the openings 50 are located along an upper edge 52 (also referred to as the ledge 52) of the trim panel 44. In other words, a small portion of each opening 50 is exposed along the upper edge 52 thereby defining a recessed area 50a (an upper end of the opening 50). The surfaces that define each opening 50 extend downward from the upper edge 52 defining the recessed area 50a such that the openings 50 face a back side of the upright seat portion 32 of the rear seat 28. The recessed areas 50a are shown in FIGS. 14, 15 and 17. More specifically, the full vertical length of each of the openings is defined along a main surface 54 of a main panel portion 56 of the trim panel 44. The main surface 54 of the main panel portion 56 is vertically oriented facing forward and therefore facing the passenger compartment 14, as shown in FIG. 6. Also shown in FIG. 6, is tether attachment surfaces 60 of the forward panel 42 that are visible through each of the openings 50. Also, the main surface 54 of the main panel portion 56 faces and is close to (proximate) a rearward side of the upright seat portion 32 of the rear seat 28. The upright seat portion 32 further conceals the main surface 54 of the main panel portion 56 when the upright seat portion 32 is in the upright orientation, as shown in FIGS. 1 and 2.

A description of the tether bracket 46 is now provided with specific reference to FIGS. 3-5 and 7-17. The tether bracket 46 attaches to the tether attachment surfaces 60 of the forward panel 42, as described further below. The tether bracket 46 is basically a shaped plate of metal that is manufactured to include an upright portion 62 (a lower portion) and a horizontal portion 64 (an upper portion). The upright portion 62 extends downward from the horizontal portion 64 and includes openings $O_1$ and $O_2$, as shown in FIG. 13. A fastener $F_1$ and an alignment pin $F_2$ are inserted into the openings $O_1$ and $O_2$, for purposes of aligning (positioning) and fixedly attaching the tether bracket 46 to the tether attachment surface 60 of the forward panel 42. The alignment pin $F_2$ is press-fitted into one of the openings or welded thereto and the fastener $F_1$ is loosely fitted into the other of the openings $O_1$ and $O_2$ so it can be rotated and tightened to a corresponding opening in the tether attachment surface 60 of the forward panel 42.

Due to the use of the fastener $F_1$ and the alignment pin $F_2$, the tether bracket 46 is removably installed to the upright wall 42 adjacent to the lower end of the window opening 22. Once installed to the tether attachment surface 60 (attachment areas 60), the horizontal portion 64 (the upper portion) of the tether bracket 46 is located proximate the upper edge 52 of the trim panel 44 and proximate an upper end of the upright seat portion 32 of the rear seat 28.

As shown in FIGS. 8 and 12-17, the horizontal portion 64 of the tether bracket 46 includes tether receiving openings 66 that can be used for attaching a child seat thereto. The upright portion 62 and the horizontal portion 64 of the tether bracket 46 are preferably perpendicular to one another. The upright portion 62 includes a pair of slots that support a first strap 68. The openings 66 in the in the upper horizontal portion 64 are dimensioned to receive straps of a child seat. A second strap 70 is attached to one of the openings 66 and can be attached to another strap of a child's seat.

The upright portion 62 of the tether bracket 46 and the opening 50 align with one another such that the tether bracket 62 is exposed through the opening 50 with the cover 48 removed and the upright seat portion 32 lowered to the folded orientation.

Figure 16:
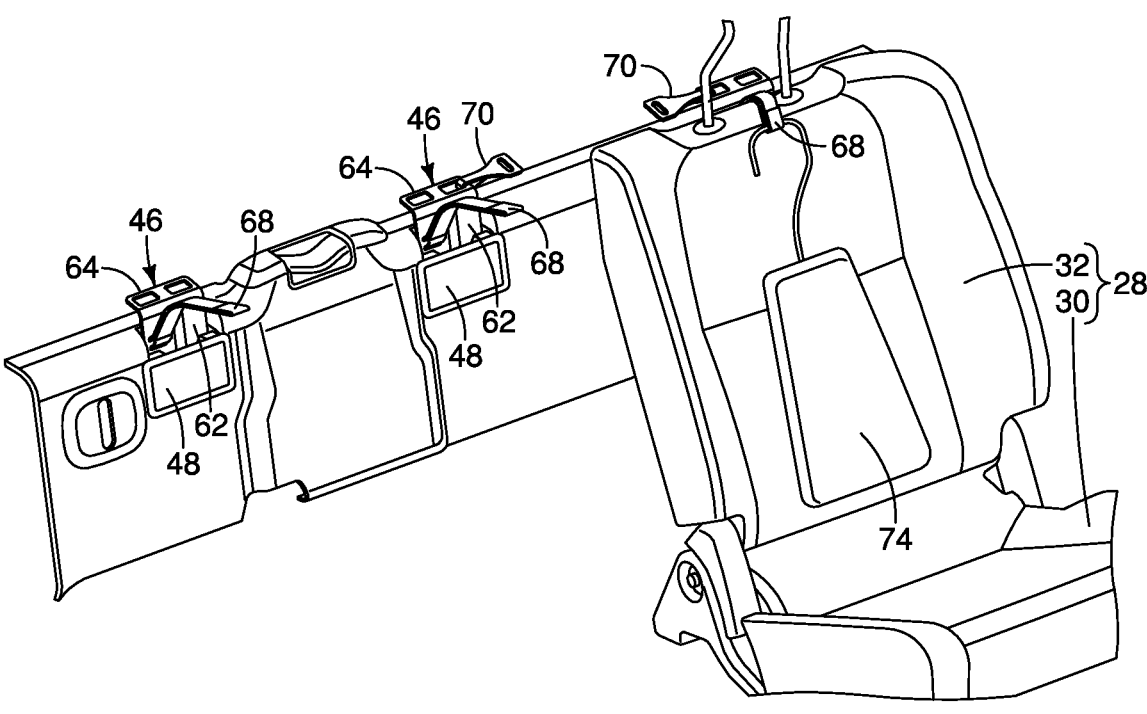
FIG. 16 is a perspective view of the trim panel, the tether brackets and the covers with a portion of the rear seat installed at one end of the trim panel with a cushion that extends downward along the upright seat portion of the rear seat hanging from the first strap of one of the tether brackets in accordance with the first embodiment.

As shown in FIG. 16, a cushion 74 can be attached to a loop at the end of the first strap 68. However, it should be understood from the drawings and the description herein that the first strap 68 and the second strap 70 are multipurpose straps that can be used to attach ties or webbing that retains cargo or groceries laid on the rear seat 28 regardless of the position of the upright seat portion 32. In other words, the first strap 68 and the second strap 70 can be used for a variety of purposes with the upright seat portion 32 in the upright orientation or the folded orientation (horizontal orientation).

As shown in FIG. 16, the center one of the tether brackets 46 and the right hand-side one of the tether brackets 46 include the second strap 70. Further, the second straps 70 are oriented to extend toward one another. The left-hand side one of the tether brackets 46 optionally does not include the second strap 70.

A description of the cover 48 is now provided with specific reference to FIGS. 3-4 and 16-22.

Figures 3, 4:
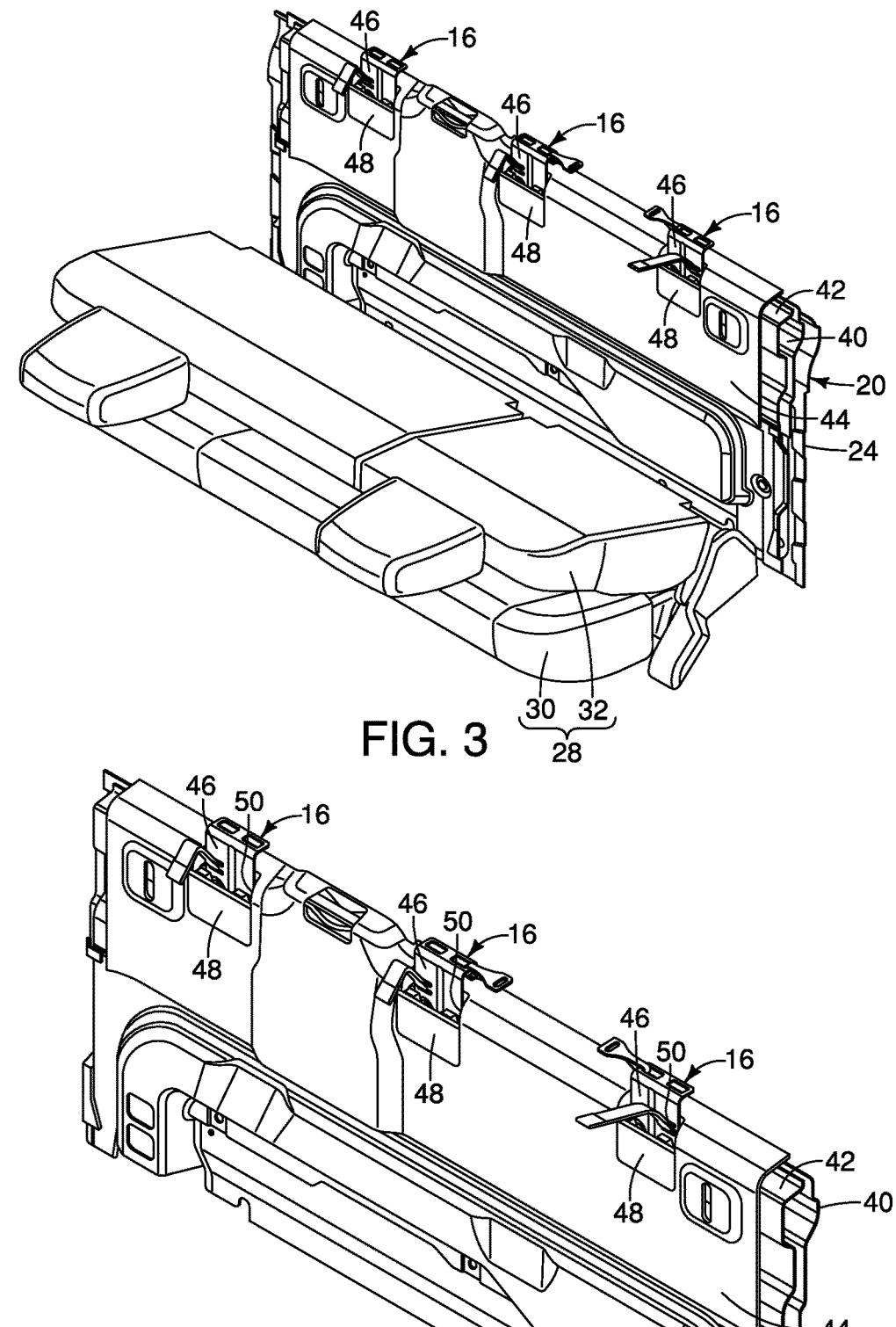
FIG. 3 is another perspective view similar to FIG. 2 of the portion of the rear upright wall with portions of the vehicle and portions of the passenger compartment removed showing the rear panel and the forward panel attached to the rear upright wall, the trim panel, the tether bracket and the rear seats with the upright seat portion in a lowered or folded orientation revealing three tether brackets that extend above the trim panel in accordance with the first embodiment.
FIG. 4 is another perspective view similar to FIGS. 2 and 3 with the rear seats removed showing the trim panel having three openings and three covers installed to lower portions of the three openings in accordance with the first embodiment.

As shown in FIGS. 3 and 4, there are three covers 48 corresponding to the three openings 50 in the trim panel 44. More specifically, each cover 48 is dimensioned and shaped to fit onto the trim panel 44 at least partially closing a corresponding one of the openings 50. All three covers 48 have basically identical features. Therefore, only one cover 48 is described herein below for the sake of brevity.

The cover 48 is dimensioned to attach to the trim panel 44 covering a lower portion of the opening 50 concealing the upright portion 62 (also referred to as the lower portion 62) of the tether bracket 46. The horizontal portion 64 (also referred to as the upper portion 64) of the tether bracket 46 extends upward through the recessed area 50a of the trim panel 44 and the upper portion of the opening 50.

As shown in FIGS. 18-22, the cover 48 includes a main panel that has a front surface 80 and a rear surface 82, lower hook protrusions 84 (also referred to as lower hooks 84) and snap-fitting side projections 86 (also referred to as upper hooks 86) and a top ledge 88 (also referred to as an upper portion 88).

The lower hook protrusions 84 are dimensioned and oriented to hook onto a lower edge of the trim panel 44 that defines a lower end of the opening 50. The upper hooks 86 are snap-fitting side projections that are dimensioned and positioned to retain the cover 48 in position covering the lower portion of the opening 50 of the trim panel 44 when the cover 48 is installed to the trim panel 44. The top ledge 88 (also referred to as the upper portion 88) of the cover 48 is dimensioned and oriented to extend in a horizontal direction at least partially cover the upper portion of the opening (recessed area 50a) and contacting the upright portion 62 of the tether bracket 46.

An upper section of the upright portion 62 of the tether bracket 46 extends into the recessed area 50 such that the upper section of the upright portion 62 is exposed above the cover 48. More specifically, the upright portion 62 of the tether bracket 46 extends out of the upper portion of the opening 50 such that the horizontal portion 64 extends rearward from the upright portion 62 over the upper edge 52 (the ledge 52) of the trim panel 22.

The fastener $F_1$ (a mechanical fastener) is concealed or covered by the cover 48 with the cover 48 attached to the trim panel 44. With the seatback portion 32 in the folded down orientation (the lowered orientation) the upright portion 62 of the tether bracket 46 and the openings 50 of the trim panel 44 are visible with the cover 48 removed.

The upper portion 88 (top ledge 88) of the cover 48 is dimensioned and oriented to extend in a horizontal directed at least partially cover the upper portion of the opening 50 and can contact the upright portion 62 of the tether bracket 46. With the upright seat portion 32 in an upright orientation the upright seat portion 32 at least partially conceals the front surface 80 (the main portion 80) of the cover 48.

Second Embodiment

Figure 23:
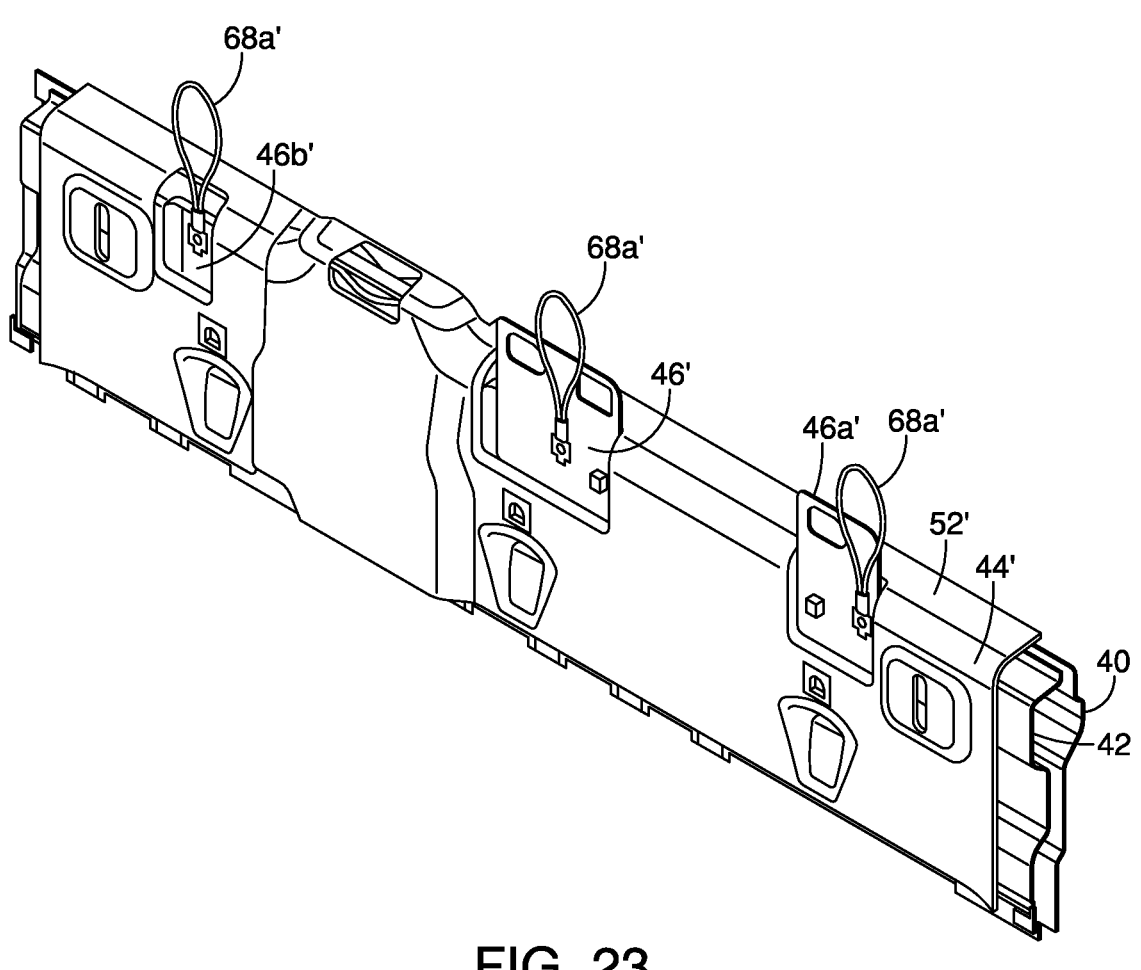
FIG. 23 is a perspective view similar to FIG. 4 with the rear seats removed showing a trim panel with three openings with three tether brackets installed to the forward panel in accordance with a second embodiment.
Figure 24:
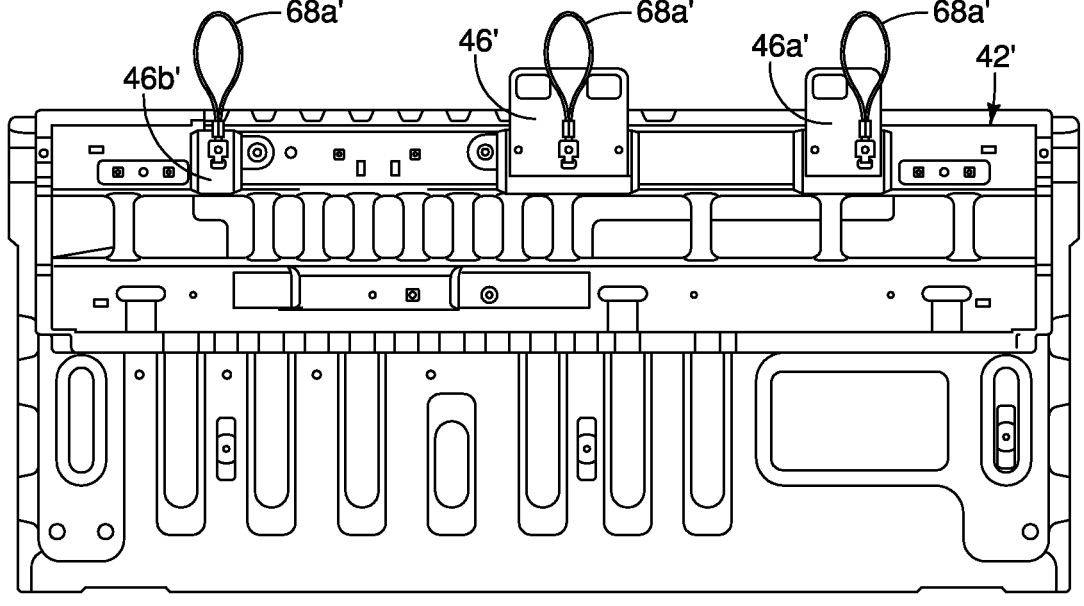
FIG. 24 is a front view similar of the forward panel with the trim panel removed showing three tether brackets installed to the forward panel in accordance with the second embodiment.

Referring now to FIGS. 23 and 24, a trim panel 44' and tether brackets 46', 46a' and 46b' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

Each of the tether brackets 46a', 46b' and 46c' differ from one another in that each of the tether brackets 46', 46a' and 46b' has a differing width as compared to the other tether brackets. Specifically, tether bracket 46' has a first width that is greater than the widths of both tether brackets 46a' and 46b'. The tether bracket 46a' has a width that is greater that the width of the tether bracket 46b' but less than the width of the tether bracket 46'. Further, the tether bracket 46b' has a width that is smaller than both of the tether brackets 46' and 46a'. All three of the tether brackets 46', 46a' and 46b' have the same height. The tether bracket 46' includes two openings that can be used to secure a child's seat. The tether bracket 46a' includes one opening that can be used to secure a child's seat. The tether bracket 46b' does not include any openings.

Each of the tether brackets 46', 46a' and 46b' includes a strap 68a' that can be used to attach cushions or other vehicle accessories. The straps 68a' are secured to corresponding ones of the tether brackets 46', 46a' and 46b' by a fastener that also secures the corresponding one of the tether brackets 46', 46a' and 46b' in place.

The trim panel 44' is secured to one or both of the rear panel 40 and/or the forward panel 42. The trim panel 44' includes openings that coincide with corresponding ones of the tether brackets 46', 46a' and 46b'. Each of these openings can receive corresponding covers (not shown in FIGS. 23 and 24) dimensioned for the differing sized openings corresponding the differing sized tether brackets 46', 46a' and 46b'

The vehicle includes many conventional components that are well known in the art. Since these conventional components are well known in the art, these components and/or structures will not be discussed or illustrated in detail herein. Rather, it will be apparent to those skilled in the art from this disclosure that the components can be any type of structure that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the tether structures. Accordingly, these terms, as utilized to describe the present invention should be interpreted relative to a vehicle equipped with the tether structures.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle tether structure, comprising
a vehicle body structure that includes an upright wall that at least partially defines a passenger compartment;
a seat installed to the passenger compartment adjacent to the upright wall; and
a tether bracket having an upright portion that is removably attached to the upright wall proximate an upper end of the seat and a horizontal portion that includes tether receiving openings for attachment thereto by a child seat,
the upright portion of the tether bracket including an alignment pin attached to the upright portion, the alignment pin being positioned and dimensioned to extend into an alignment opening in the upright wall.

2. The vehicle tether structure according to claim 1, wherein
the tether bracket includes at least one mechanical fastener removably attached to the upright wall of the vehicle body structure.

3. The vehicle tether structure according to claim 2, wherein
the alignment pin is attached to the upright portion so to be adjacent to and parallel to the mechanical fastener.

4. The vehicle tether structure according to claim 1, wherein
the upright wall is a rear wall of the passenger compartment.

5. The vehicle tether structure according to claim 4, wherein
the tether bracket is attached to the upright wall proximate a lower end of a rear window opening of the vehicle body structure.

6. The vehicle tether structure according to claim 1, wherein
the upright portion and the horizontal portion of the tether bracket are perpendicular to one another.

7. The vehicle tether structure according to claim 1, wherein
the upright portion extends downward from the horizontal portion of the tether bracket.

8. The vehicle tether structure according to claim 1, wherein
the tether bracket is attached to the upright wall proximate a lower end of a rear window opening of the vehicle body structure.

9. A vehicle tether structure, comprising:
a vehicle body structure that includes an upright wall that at least partially defines a passenger compartment;
a seat installed to the passenger compartment adjacent to the upright wall; and
a tether bracket having an upright portion that is removably attached to the upright wall proximate an upper end of the seat and a horizontal portion that includes tether receiving openings for attachment thereto by a child seat, the tether bracket attached to the upright wall proximate a lower end of a rear window opening of the vehicle body structure; and
a trim panel dimensioned such that when attached to the upright wall the trim panel covers an area below the rear window opening.

10. The vehicle tether structure according to claim 9, wherein
the trim panel includes an opening with the upright portion of the tether bracket and the opening aligning with one another such that the tether bracket is exposed through the opening.

11. The vehicle tether structure according to claim 10, wherein the seat includes a seatback portion that pivots between an upright orientation and a folded down orientation such that with the seatback portion in the upright orientation the upright portion of the tether bracket is covered and with the seatback portion in the folded down orientation the upright portion of the tether bracket and the opening are visible.

12. A vehicle tether structure, comprising a vehicle body structure that includes an upright wall that at least partially defines a passenger compartment, the upright wall also defining a window opening;

a trim panel installed to the upright wall with an upper edge of the trim panel being proximate a lower end of the window opening;

a seat installed to the passenger compartment adjacent to the upright wall; and a tether bracket removably installed to the upright wall adjacent to the lower end of the window opening and proximate the upper edge of the trim panel.

13. The vehicle tether structure according to claim 12, wherein the tether bracket has an upright portion that is removably attached to the upright wall proximate an upper end of the seat and a horizontal portion that includes tether receiving openings for attachment thereto by a child seat tether.

14. The vehicle tether structure according to claim 13, wherein the upright portion and the horizontal portion of the tether bracket are perpendicular to one another.

15. The vehicle tether structure according to claim 14, wherein the upright portion extends downward from the horizontal portion of the tether bracket.

16. The vehicle tether structure according to claim 14, wherein the trim panel includes an opening with the upright portion of the tether bracket and the opening aligning with one another such that the tether bracket is exposed through the opening.

17. The vehicle tether structure according to claim 16, wherein the trim panel includes a main surface facing the passenger compartment with the upper edge having a recessed area relative to the main surface located above the opening such that an upper section of the upright portion of the tether bracket extends into the recessed area.

18. The vehicle tether structure according to claim 12, wherein the seat includes a seatback portion that pivots between an upright orientation and a folded down orientation such that with the seatback portion in the upright orientation the upright portion of the tether bracket is covered and with the seatback portion in the folded down orientation the upright portion of the tether bracket and the opening are visible.

19. The vehicle tether structure according to claim 12, wherein the upright wall is a rear wall of the passenger compartment.

* * * * *